United States Patent [19]

Wu et al.

[11] Patent Number: 4,473,620
[45] Date of Patent: Sep. 25, 1984

[54] ENCAPSULATED BUTYLATED HYDROXYANISOLE

[75] Inventors: Stephen H. W. Wu; M. Akram Sandhu, both of Kingsport; Charles H. Benton, Blountville, all of Tenn.

[73] Assignee: Eastman Kodak Company, Rochester, N.Y.

[21] Appl. No.: 452,578

[22] Filed: Dec. 23, 1982

[51] Int. Cl.$^3$ .......................... A23D 5/04; B32B 9/00
[52] U.S. Cl. .............................. 428/402.24; 252/404; 426/96; 426/546
[58] Field of Search ............... 426/96, 546; 427/213.3, 427/213.3 C, 212; 428/402.24

[56] References Cited

U.S. PATENT DOCUMENTS

| | | | |
|---|---|---|---|
| 2,526,865 | 10/1950 | Gyorgy | 426/546 X |
| 3,131,068 | 4/1964 | Greif et al. | 426/96 |
| 3,221,029 | 11/1965 | Benton, Jr. | 264/9 X |
| 3,502,484 | 3/1970 | Kolasinski | 426/546 |

OTHER PUBLICATIONS

The Merck Index of Chemicals and Drugs, Merck & Co. Inc., Rahway, N.J., 1960, pp. 1050, 1100, 1101.
Chemicals Used in Food Processing, National Academy of Sciences, National Res. Council, Wash. D.C., 1965, pp. 9–12.

*Primary Examiner*—Robert Yoncoskie
*Attorney, Agent, or Firm*—John F. Stevens; Daniel B. Reece, III

[57] ABSTRACT

Disclosed are free flowing, solid, antioxidant particles comprising butylated hydroxyanisole encapsulated within an edible polymeric coating. The coating is adapted to release the butylated hydroxyanisole when the particles are in contact with vegetable oil or molten fat. The process for preparing these antioxidant particles includes establishing a molten butylated hydroxyanisole as droplets in a liquid dispersion containing a dissolved film forming edible polymer. The liquid dispersion is cooled below the melting temperature of the butylated hydroxyanisole droplets thereby causing the dissolved polymer to form an encapsulated film around the solidified droplets and surface drying the solidified droplets.

7 Claims, No Drawings

ENCAPSULATED BUTYLATED HYDROXYANISOLE

DESCRIPTION

1. Technical Field

This invention relates to butylated hydroxyanisole (BHA) encapsulated in a polymeric coating and a process for producing this product.

2. Background Art

Food-grade antioxidants are used in food products such as edible animal and vegetable fats and oils, and oil-soluble vitamins to prevent oxidative rancidity and to preserve food flavor. BHA is a common food-grade antioxidant which is not water-soluble, but is soluble in oils and fats. BHA has outstanding compatibility with food fats and gives excellent stability to fats, oils, and fat-containing food products and food-packaging materials.

BHA is made commercially in white waxy flake or large tablet form. Because of the material characteristics—low melting temperature, ease of sublimation, combination of isomers, and waxy surface—it is difficult to render BHA as free-flowing powder or nonsticky small granules.

U.S. Pat. No. 3,221,029 describes a process for preparing an autogeneous free-flowing vitamin E active beadlet product.

DESCRIPTION OF THE INVENTION

According to the present invention, free-flowing, solid, nonsticky, low-density antioxidant particles and a process for preparing such particles are provided. The particles comprise BHA encapsulated within an edible polymeric coating which is adapted to release the BHA when the particles are in contact with vegetable oil. The particles are of a size such that at least 50% by weight are in the range of about −20 to about +120 mesh U.S. standard screen size.

BHA is a mixture of 3-tert-butyl-4-hydroxyanisole and 2-tert-butyl-4-hydroxyanisole. Food grade BHA has a melting point of 48°–55° C. and is a commercially available product.

Edible polymers useful as coating materials for BHA include water-soluble polymers such as cellulose derivatives having a gel point above 50° C., for example, such polymers as methyl cellulose, hydroxypropyl cellulose, cellulose acetate phthalate and carboxymethyl cellulose. Water-soluble colloids such as gum arabic may be used.

Synthetic polymers such as poly(2-methyl-5-vinylpyridine/styrene) 80:20, poly(2-methyl-5-vinyl-pyridine), other poly(vinylpyridines) and copolymers thereof are also found to be useful as coatings in accordance with this invention.

The process for making the encapsulated BHA particles according to this invention comprises first melting a quantity of BHA to form a molten mass. The molten mass is then admixed with a liquid dispersion medium at a temperature above the melting temperature of BHA to form the molten mass into dispersed droplets. The liquid dispersion medium comprises the film forming edible polymer described above dissolved in a solvent in which the BHA is substantially insoluble. Next, the liquid dispersion medium containing the dispersed droplets is cooled to a temperature below the melting temperature of the BHA to solidify the droplets and to cause the dissolved polymer to form a film around the solidified droplets. Finally, the solidified droplets are separated and surface dried.

The liquid dispersion medium in which the dispersed droplets are formed comprises a solution of the polymer described above. Solvents for these polymers are well known in the art. It is preferred that water be used as the solvent, and that the concentration of polymer in the solution be about 0.5% to about 2.5% weight per volume (w/v).

It has been found that molten BHA, at a temperature of between 58° and 70° C., has a viscosity which, when mixed in the liquid dispersion medium having a temperature of 60° C. to 80° C., results in the desired droplet size of BHA when water or a liquid having a viscosity similar to water is used and the concentration of polymer is about 0.5–2.5% (w/v).

The viscosity of the polymer solution is a function of both the pH of the solution and polymer concentration. Preferably, the pH and concentration are maintained at levels such that the viscosity is between about 12 and 60 cps. Viscosity of the BHA at encapsulation temperature (just above melting, i.e., about 60° C.) is about 25 cps. For example, the viscosity of a 0.5% solution of cellulose acetate phthalate increases rapidly beginning at about pH of 2.5, reaches a maximum at about pH of 4 and decreases rapidly as the pH is increased above 4.

The encapsulated BHA droplets are next cooled to a temperature of about 7° C. to about −10° C. to solidify the BHA and to cause the polymer to precipitate on the surface of the droplets.

In some cases, precipitation of the polymer on the surface of the droplets may be hastened by raising the pH of the liquid dispersion medium, or by the addition of 2 to 10% (w/v) salt such as sodium chloride, based on the volume of the medium.

A clear aqueous solution of methyl cellulose, 0.5–2% (w/v) may be prepared by stirring the polymer powder in water at room temperature, heating the dispersion to 50°–55° C. above the gel point of methyl cellulose, an then cooling the colloidal solution back to room temperature, 23° C., to yield a clear solution.

An aqueous solution of C-A-P (0.5–2% w/v) may be prepared by admixing the polymer powder and 0.1 mole/liter, pH 7 phosphate, or citrate-phosphate buffer at 23° C. until the solution is clear. Similarly, an aqueous solution of poly(2-methyl-5-vinylpyridine/styrene, 80:20) may be prepared by admixing dry polymer powder and 0.1 mole/liter pH 2.9 phosphate-HCl, or citrate-phosphate buffer at 23° C.

The viscosity of the polymer solutions are determined by a viscometer (Brookfield, Model RV) at room temperature (23° C.).

The following examples are set forth for a better understanding of the invention.

EXAMPLE 1

Twenty-five grams of BHA flakes are melted and the molten mass is added to a 250 mL solution of methyl cellulose (0.5% w/v) at 60° C. Tiny droplets are formed in the dispersion medium with the aid of a stirrer revolving at 400 rpm. The temperature of the dispersion medium is maintained at 60° C. for 5 minutes and then rapidly cooled to 5° C. The beads are then filtered and dried in vacuum. The product is observed to be nonsticky and free-flowing. BHA beads' bulk density is 0.37 gm/mL as compared to 0.47 gm/mL for the starting material. A typical particle size distribution of the beads is 12.4% by weight plus 20 mesh (U.S. standard screen size), 76.7% plus 40 mesh, 10.3% plus 60 mesh, and 0.6% minus 60 mesh. Most beads are on 40-mesh screen size. Two grams of dry beads are added to 40 mL of safflower cooking oil with stirring. It takes 10 minutes to completely dissolve the active ingredient, BHA, from the beads, and it takes 18 minutes for the same amount of BHA flakes in the same test. After BHA is completely dissolved, many tiny, transparent, insoluble, hollow spherical or hemi-spherical shells of polymeric networks are observed in the clear oil solution. These phenomena indicate that BHA beads are coated with a porous polymeric matrix, which did not hinder the dissolution of BHA in oil. The residual polymeric coatings are easily removed by a metal screen, centrifugation, or similar separation processes to yield a clear oil solution.

EXAMPLE 2

This example is an illustration of adding salt to the dispersion medium to enhance the interfacial precipitation of methyl cellulose on BHA beads and thus to increase the coating weight of the beads.

Twenty-five grams of molten BHA are added to 250 mL aqueous solution of methyl cellulose (0.5% w/v) at 60° C. with stirring. As soon as the droplets are formed, the temperature of the dispersion medium is lowered to 20° C. and 10 grams of sodium chloride are added to the medium. Precipitation of methyl cellulose on BHA beads is observed. The dispersion medium is further cooled down to 5° C. and then filtered. The filtrate is clearer than the milky, colloidal dispersion obtained in Example 1. The wet beads are dried in vacuum. The dry product is free-flowing and nonsticky. Two grams of dry beads are added to 40 mL safflower oil and it takes 10 minutes to dissolve the encapsulated BHA. The insoluble polymeric coatings are separated, washed with acetone, dried, and weighed. The polymeric coating on BHA beads is determined to be 4.7% methyl cellulose and 1.2% NaCl by weight of the encapsulated product.

EXAMPLE 3

This example is to illustrate the preparation of free-flowing BHA beads by using a pH-sensitive polymer, cellulose acetate phthalate (C-A-P). Molten BHA is dispersed into 250 mL of 2%, pH 6.7 aqueous solution of C-A-P (viscosity, 20 cps at 23° C.) at 60° C. As soon as droplets of appropriate size form in the dispersion medium, the temperature of the medium is rapidly lowered and the pH of the solution adjusted to 2.0 by adding 0.5 N HCl, or dilute citric acid if desired. Beads are encapsulated with C-A-P. The dry product is nonsticky and free-flowing. The bulk density is 0.52 gm/mL. The particle size distribution is 36% by weight plus 40 mesh (U.S. standard screen size) and 64% by weight plus 60 mesh screen size. Within 10 minutes, 2 grams of this product dissolves in 40 mL of safflower oil. Empty shell-like C-A-P coatings are left in the oil solution and were easily separated by filtration or centrifugation.

EXAMPLE 4

This example is to illustrate the preparation of free-flowing BHA beads using gum arabic as an encapsulating agent under another set of process conditions.

Twenty-five grams of molten BHA are poured into a 250-mL solution of gum arabic (4% w/v, viscosity 16.5 cps) at 70° C. The mixture is stirred and maintained at 70° C. for 5 minutes. The mixture is then rapidly chilled and allowed to stand at 0° C. until the beads are solidified and hardened. BHA beads are then filtered and dried. The dry product is free-flowing. Screen analysis shows that 60% by weight of the beads are −20/+40 mesh (U.S. standard screen size). Results from the oil-solubility test indicate that BHA is rapidly dissolved and leaves a very small amount of transparent, empty spheres of gum arabic in the solution. Ferric chloride and gelatin added to the dispersion medium enhances the precipitation of gum arabic and thus the coating weight of the beads.

The invention has been described in detail with particular reference to preferred embodiments thereof, but it will be understood that variations and modifications will be affected within the spirit and scope of the invention.

We claim:

1. Free flowing, solid, antioxidant particles comprising butylated hydroxyanisole encapsulated within an edible polymeric coating, said coating being adapted to release said butylated hydroxyanisole when said particles are in contact with vegetable oil, at least 50% by weight of said particles having a size in the range from about −20 to about +120 mesh U.S. standard screen size.

2. Free-flowing antioxidant particles according to claim 1 wherein said polymeric coating is selected from the group consisting of methyl cellulose, hydroxypropyl cellulose, cellulose acetate phthalate, carboxymethyl cellulose, gum arabic, poly(2-methyl-5-vinylpyridine/styrene), poly(2-methyl-5-vinylpyridine, and poly(4-vinylpyridine).

3. A process for preparing free flowing, solid antioxidant particles which comprises
  (a) melting a quantity of butylated hydroxyanisole whereby a molten mass of butylated hydroxyanisole is formed,
  (b) establishing and maintaining said molten mass as dispersed droplets by admixing said molten mass with a liquid dispersion medium at a temperature above the melting temperature of the butylated hydroxyanisole, said liquid dispersion medium comprising a film forming, edible polymer and a solvent for said polymer, said butylated hydroxyanisole being substantially insoluble in said solvent,
  (c) cooling the liquid dispersion medium containing the dispersed droplets to a temperature below the melting temperature of the butylated hydroxyanisole to solidify the droplets and to cause said dissolved polymer to form a film around the solidified droplets, and
  (d) surface drying the encapsulated, solidified droplets.

4. Process according to claim 3 wherein said polymeric coating is selected from the group consisting of methyl cellulose, hydroxypropyl cellulose, cellulose acetate phthalate, carboxymethyl cellulose, gum arabic, poly(2-methyl-5-vinylpyridine/styrene), poly(2-methyl-5-vinylpyridine, and poly(4-vinylpyridine).

5. Process according to claim 3 wherein the solvent is water.

6. Process according to claim 3 wherein the concentration of polymer in said liquid dispersion medium is about 0.5% to about 2.5% weight per volume.

7. Process according to claim 3 wherein the viscosity of the molten mass of butylated hydroxyanisole is between about 12 and about 60 cps.

* * * * *